United States Patent
Omi

(10) Patent No.: US 10,019,638 B2
(45) Date of Patent: Jul. 10, 2018

(54) FACE IMAGE CAPTURING DEVICE AND DRIVER CONDITION DETERMINATION DEVICE

(71) Applicant: DENSO CORPORATION, Kariya, Aichi-pref. (JP)

(72) Inventor: Takuhiro Omi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 33 days.

(21) Appl. No.: 15/104,915

(22) PCT Filed: Dec. 8, 2014

(86) PCT No.: PCT/JP2014/006117
§ 371 (c)(1),
(2) Date: Jun. 15, 2016

(87) PCT Pub. No.: WO2015/093004
PCT Pub. Date: Jun. 25, 2015

(65) Prior Publication Data
US 2016/0314366 A1    Oct. 27, 2016

(30) Foreign Application Priority Data
Dec. 18, 2013 (JP) .................... 2013-261880

(51) Int. Cl.
*G06K 9/00* (2006.01)
*G03B 3/02* (2006.01)
(Continued)

(52) U.S. Cl.
CPC ........... *G06K 9/00845* (2013.01); *G03B 3/02* (2013.01); *G06K 9/00255* (2013.01);
(Continued)

(58) Field of Classification Search
None
See application file for complete search history.

(56) References Cited

U.S. PATENT DOCUMENTS

2010/0295670 A1* 11/2010 Sato .................. B60Q 9/00
340/458
2011/0058085 A1   3/2011 Ito et al.
(Continued)

FOREIGN PATENT DOCUMENTS

| JP | H06178302 A | 6/1994 |
| JP | H06222258 A | 8/1994 |

(Continued)

*Primary Examiner* — Idowu O Osifade
(74) *Attorney, Agent, or Firm* — Knobbe, Martens, Olson & Bear, LLP

(57) ABSTRACT

In a face image capturing device, a focal point of a fixed-focus in-vehicle camera is set to a position where a circle of confusion with respect to a foremost face position is larger than the circle of confusion with respect to a rearmost face position. The rearmost face position is where the driver's face is positioned when a driver's seat is moved to the rearmost limit. The foremost face position is where the driver's face is positioned when the driver's seat is moved to the foremost limit. When the focal point of the in-vehicle camera is set to the above position, the focal point can be moved rearward to reduce the blurring of a face image at the rearmost face position. Even if the blurring of the face image at the rearmost face position is increased, a driver condition can be accurately determined at all times.

6 Claims, 11 Drawing Sheets

(51) Int. Cl.
    *G08B 21/06*     (2006.01)
    *H04N 5/232*     (2006.01)
    *G03B 15/00*     (2006.01)
    *G06K 9/32*     (2006.01)
    *G06K 9/42*     (2006.01)

(52) U.S. Cl.
    CPC ......... *G08B 21/06* (2013.01); *H04N 5/23219* (2013.01); *H04N 5/23229* (2013.01); *H04N 5/23296* (2013.01); *G03B 15/00* (2013.01); *G06K 9/00281* (2013.01); *G06K 9/3241* (2013.01); *G06K 9/42* (2013.01)

(56) References Cited

U.S. PATENT DOCUMENTS

| | | | |
|---|---|---|---|
| 2012/0188355 A1* | 7/2012 | Omi | A61B 5/0077 348/78 |
| 2013/0113912 A1 | 5/2013 | Ito et al. | |
| 2015/0145984 A1 | 5/2015 | Nonaka et al. | |

FOREIGN PATENT DOCUMENTS

| | | | |
|---|---|---|---|
| JP | H08292351 | A | 11/1996 |
| JP | 2003271931 | A | 9/2003 |
| JP | 2005-242428 | A | 9/2005 |
| JP | 2009113621 | A | 5/2009 |
| JP | 2009252094 | A | 10/2009 |
| JP | 2012-039591 | A | 2/2012 |

\* cited by examiner

FIG. 3
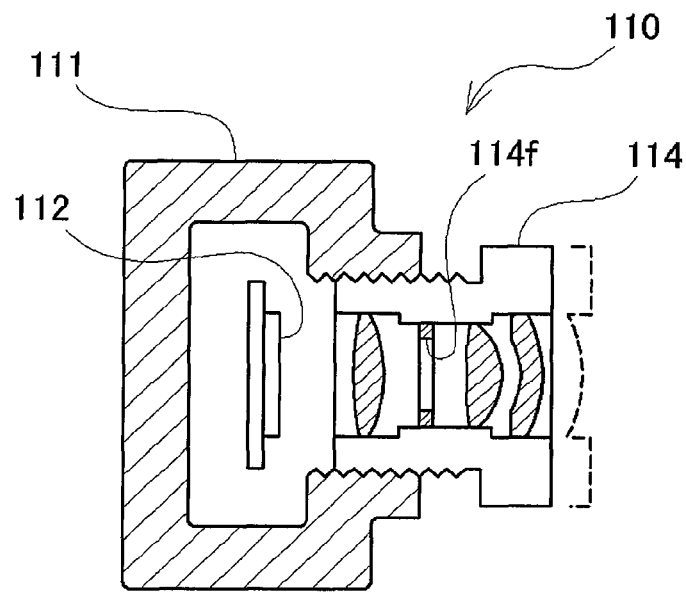
FIG. 4A
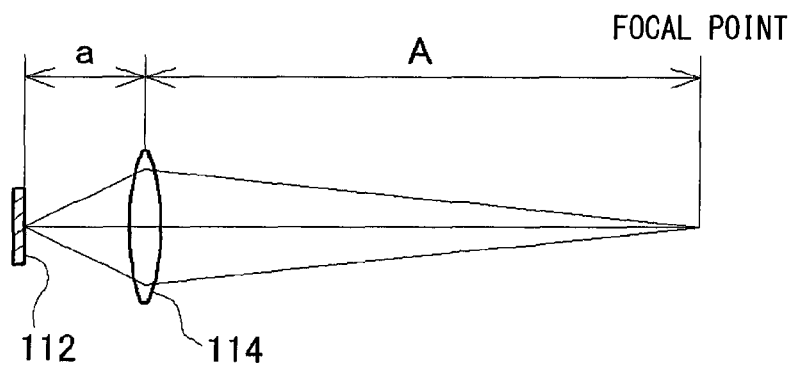
FIG. 4B
$$\frac{1}{f} = \frac{1}{a} + \frac{1}{A}$$

$$Lr = \frac{\delta \cdot FNo \cdot A^2}{f^2 - \delta c \cdot FNo \cdot A} \quad \text{-----} \quad (1)$$

$$Lf = \frac{\delta \cdot FNo \cdot A^2}{f^2 + \delta c \cdot FNo \cdot A} \quad \text{-----} \quad (2)$$

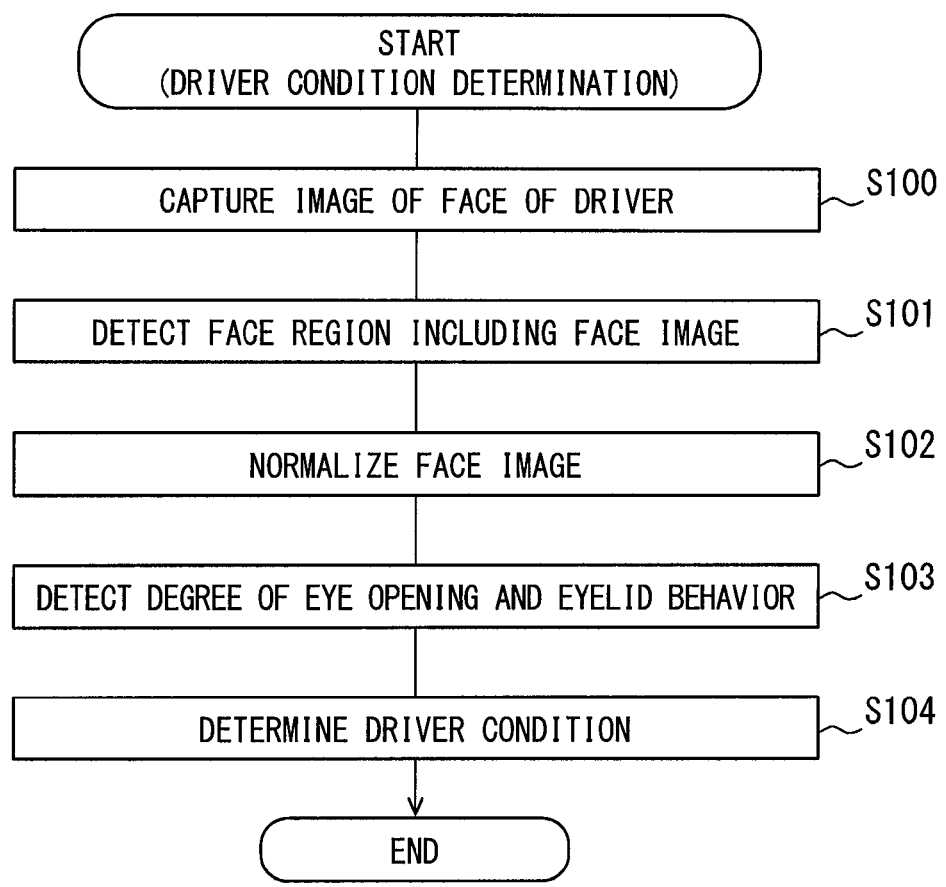

FP FACE IMAGE

SP FACE IMAGE

RP FACE IMAGE

《REFERENCE》

FACE IMAGE CAPTURING DEVICE AND DRIVER CONDITION DETERMINATION DEVICE

CROSS REFERENCE TO RELATED APPLICATION

This application is based on Japanese Patent Application No. 2013-261880 filed on Dec. 18, 2013, the disclosure of which is incorporated herein by reference.

TECHNICAL FIELD

The present disclosure relates to a face image capturing device that captures an image of the face of a driver by using an in-vehicle camera, and also relates to a driver condition determination device that analyzes the face image to determine the condition of the driver.

BACKGROUND ART

A well-known driving assistance technology analyzes a driver's face image captured by an in-vehicle camera to determine the condition of a driver that affects driving safety, such as the awareness, aimlessness, and drowsiness of the driver during driving (the condition of the driver is referred to as the "driver condition" in this description), and issues, for example, a warning as needed. For accurate determination of the driver condition, it is preferred that the driving assistance technology be capable of capturing a face image that is as sharp as possible.

Incidentally, vehicles are generally configured so that a seat position can be adjusted in a front-rear direction on the basis of the physical size and preferences of the driver. Adjusting the seat position also moves the position of the face of the driver in the front-rear direction. Under these circumstances, a technology for estimating the face position from the seat position adjusted by the driver and adjusting the focal point of the in-vehicle camera is proposed in order to capture a sharp face image even when the position of the face is moved (Patent Literature 1). Additionally proposed is a technology for capturing a face image in consideration of a change in the posture of the driver during driving (Patent Literature 2).

Meanwhile, a fixed-focus in-vehicle camera having a simple structure is also widely used in place of an in-vehicle camera capable of adjusting the focal point. The fixed-focus in-vehicle camera is not capable of moving the focal point. Therefore, the fixed-focus in-vehicle camera is used with an optical aperture decreased (with the f-number increased) in order to obtain a sharp image even when the face position of the driver is moved forward or rearward. The reason is that a sharp image is obtained without regard to forward or rearward movement of the face position as the depth of field (the range of a subject position within which a focused image is obtained) increases with a decrease in the optical aperture (an increase in the f-number). However, a high-intensity light source is required to compensate for light intensity insufficiency when the aperture is decreased (the f-number is increased). Consequently, setup is performed without excessively decreasing the optical aperture. Ideally, therefore, the optical aperture is set in such a manner that the depth of field agrees with the range of face position movement of the driver.

PRIOR ART LITERATURE

Patent Literature

JP H06-178302 A
JP 2009-113621 A

SUMMARY OF INVENTION

However, when the fixed-focus in-vehicle camera is used, the accuracy of driver condition detection may decrease even if the optical aperture is optimally set to obtain a sharp face image within the whole range of face position movement of the driver. Under these circumstances, the inventors of the present disclosure have found that such a baffling phenomenon is due to the fact that the image of a face positioned apart from the in-vehicle camera and the image of a face positioned close to the in-vehicle camera cannot be handled in the same manner from the viewpoint of driver condition detection no matter whether both of the images are similarly sharp.

The present disclosure has been made based on the above-described findings of the inventors. An object of the present disclosure is to provide a technology that makes it possible to accurately detect the driver condition even when a fixed-focus in-vehicle camera is used.

According to one aspect of the present disclosure, a face image capturing device and a driver condition determination device constantly determine the focal point (the most focused point) of an imaging optical system in a manner described below in a situation where the imaging optical system is used to form a face image of a driver on an image sensor. The focal point is fixed at a position where a circle of confusion with respect to a foremost face position (FP) is larger than the circle of confusion with respect to a rearmost face position (RP). The rearmost face position is where the face of the driver is positioned when a driver's seat is moved to the rearmost limit. The foremost face position is where the face of the driver is positioned when the driver's seat is moved to the foremost limit. The rearmost face position and the foremost face position are determined for each vehicle on the basis of positional limits to which the driver's seat can be moved and of statistical data on the physical size of the driver.

Although the details of a mechanism will be explained later, it has been found that the reason why the accuracy of driver condition detection decreases no matter whether a sharp face image is obtained within the whole range of face position movement of the driver is that the blurring of a face image increases during driver condition detection if the driver moves the face position rearward. Therefore, when the circle of confusion with respect to the foremost face position is allowed to be larger than the circle of confusion with respect to the rearmost face position, the focal point (the most focused point) of the imaging optical system can be moved rearward. This makes it possible to obtain a less blurry face image even at the rearmost face position. As a result, the driver condition can be accurately detected at all times even when the blurring of the face image increases during driver condition detection.

According to a second aspect of the present disclosure, the face image capturing device according to the first aspect of the present disclosure may set the focal point of the imaging optical system at a position where the MTF (Modulation Transfer Function) at the foremost face position is a value smaller than the MTF at the rearmost face position. The MTF is a well-known index value that is used to evaluate the performance of an optical system. The smaller the value of the MTF, the greater the blurring of an obtained image.

The second aspect permits the focal point (the most focused point) of the imaging optical system to move rearward. Thus, a non-blurry face image can be obtained even at the rearmost face position. Consequently, the driver condition can be accurately detected even when the blurring of the face image increases during driver condition detection.

According to a third aspect of the present disclosure, the face image capturing device according to the first or second aspect may set the focal point of the imaging optical system at an intermediate position between the foremost face position and the rearmost face position or at a position farther away from the imaging optical system than the intermediate position.

The focal point of a conventional fixed-focus imaging optical system is always set at a position forward from the intermediate position between the foremost face position and the rearmost face position (at a position near the imaging optical system). Therefore, when the focal point of the imaging optical system is set at the intermediate position between the foremost face position and the rearmost face position or at a position farther away from the intermediate position, a non-blurry face image can be obtained even at the rearmost face position. Consequently, the driver condition can be accurately detected even when the blurring of the face image increases during driver condition detection.

According to a fourth aspect of the present disclosure, the face image capturing device according to the first, second, or third aspect may set the f-number of the imaging optical system to a value not greater than 2.0. The f-number is a well-known index value that is used to evaluate the performance of an optical system. The smaller the f-number, the higher the brightness and light intensity of the image obtained. However, it is known that the obtained image is likely to become blurred when the subject moves forward or rearward.

To obtain a sharp, non-blurry face image within a range between the foremost face position and the rearmost face position, it is generally necessary for a fixed-focus imaging optical system to use an f-number of approximately 2.8. It is difficult to make a design that uses an f-number of 2.0 or smaller. Meanwhile, the face image capturing device according to the fourth aspect permits the face image to become blurred in the vicinity of the foremost face position. This makes it possible to set the f-number to 2.0 or smaller. As a result, a bright face image can be captured even when the available light intensity is low.

According to a fifth aspect of the present disclosure, the face image capturing device according to the first, second, third, or fourth aspect may be mounted in a vehicle that permits the driver to adjust the driver's seat position in a front-rear direction, and applied to the driver condition determination device that analyzes the face image of the driver to determine the driver condition.

As described above, the face image capturing device according to the present disclosure is capable of capturing a non-blurry face image even when the driver's seat is moved rearward by the driver. Therefore, when the captured face image is analyzed for driver condition determination, the driver condition can be accurately determined.

According to a sixth aspect of the present disclosure, the driver condition determination device according to the fifth aspect may normalize a face image, which is captured by the face image capturing device, to a predetermined size by using, for example, a digital processing method and analyze the normalized face image to determine the driver condition.

When the driver's seat is moved rearward by the driver, a relatively small face image is captured. Therefore, the captured face image is enlarged by normalization. When the captured face image is enlarged, the blurring of the captured face image increases. The face image capturing device according to the sixth aspect is capable of capturing a non-blurry face image even when the driver's seat is moved rearward by the driver. Therefore, the blurring of the normalized face image can be reduced. Further, when the driver's seat is moved forward by the driver, a relatively large face image is captured. Therefore, the captured face image is reduced in size by normalization. In this instance, the blurring of the face image is also reduced. Consequently, the blurring of the normalized face image can be reduced without regard to a position to which the driver's seat is moved by the driver. As a result, the driver condition can be accurately determined at all times.

BRIEF DESCRIPTION OF DRAWINGS

The above and other objects, features, and advantages of the present disclosure will become more apparent from the following detailed description made with reference to the accompanying drawings, in which:

FIG. 3 is a cross-sectional view illustrating a general internal structure of an in-vehicle camera;

FIGS. 4A and 4B illustrate a principle on which the focal point of an imaging optical system can be adjusted by fine-tuning the position of the imaging optical system with respect to an image sensor;

FIG. 7 is a flowchart illustrating a driver condition determination process that determines a driver condition from a face image;

DESCRIPTION OF EMBODIMENTS

An embodiment of the present disclosure will now be described to clearly define the above-described present disclosure.

A. Device Configuration

Figure 1:
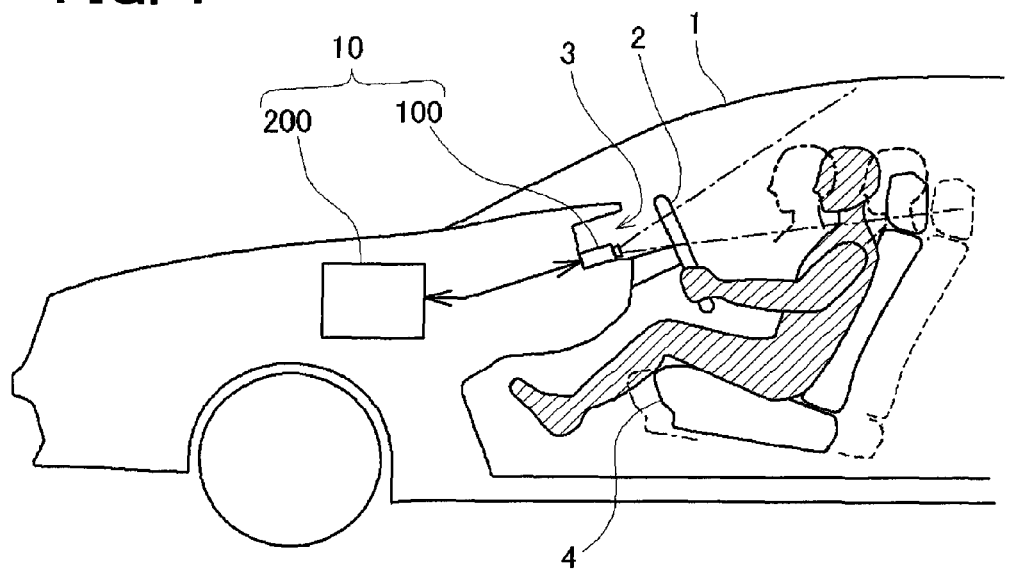
FIG. 1 is a diagram illustrating a vehicle in which a driver condition determination device according to an embodiment of the present disclosure is mounted.

FIG. 1 illustrates a vehicle 1 in which a driver condition determination device 10 according to the embodiment is mounted. The driver condition determination device 10 includes an image capturing unit 100 and a control device 200. The image capturing unit 100 is disposed in front of a driver. The control device 200 is connected to the image capturing unit 100. The image capturing unit 100 is disposed in front of an instrument panel that is positioned behind a steering wheel 2 as viewed from the driver, and capable of capturing a face image of the driver. In FIG. 1, the driver is shaded with hatching for purposes of illustration.

The seat position of a driver's seat 4 in which the driver is seated can be adjusted in a front-rear direction. Adjusting the seat position moves the face position of the driver forward or rearward. In FIG. 1, the head of the driver that is positioned when the driver's seat 4 is moved forward (in the direction of travel of the vehicle 1) to the foremost limit is indicated by a thick one-dot chain line. Additionally, the head of the driver that is positioned when the driver's seat 4 is moved to the rearmost limit is indicated by a thick broken line. Further, as indicated by a thin one-dot chain line in FIG. 1, the viewing angle of the image capturing unit 100 is set so that the face of the driver can be photographed even when the driver's seat 4 is moved forward or rearward.

Figure 2:
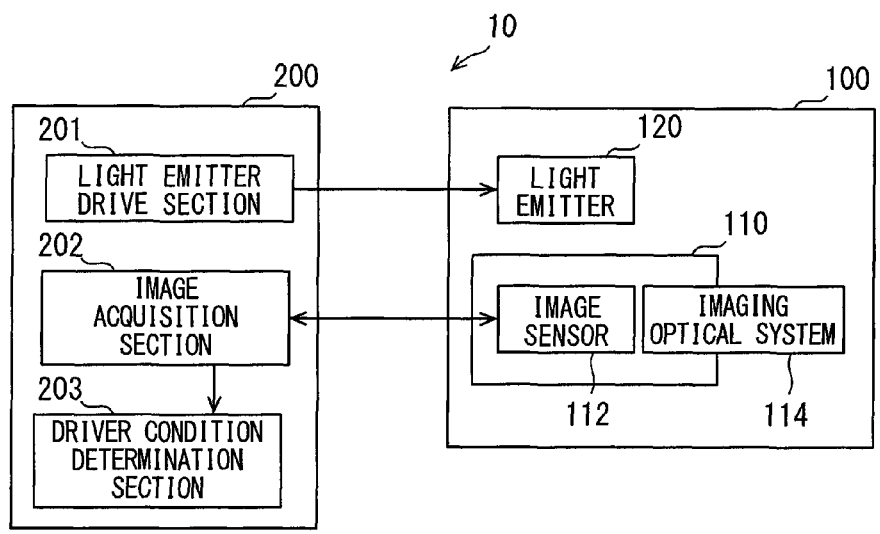
FIG. 2 is a general block diagram illustrating an image capturing unit and a control device according to the embodiment.

FIG. 2 is a general block diagram illustrating the image capturing unit 100 and the control device 200 according to the embodiment. The image capturing unit 100 includes an in-vehicle camera 110 and a light emitter 120. The in-vehicle camera 110 captures the face image of the driver. The light emitter 120 emits infrared light to the face of the driver. In the present embodiment, the light emitter 120 is formed of an infrared LED that emits light ranging from the infrared light to the long wavelength side of visible light.

The in-vehicle camera 110 includes an image sensor 112 and an imaging optical system 114. The image sensor 112 converts the face image of the driver to image data. The imaging optical system 114 forms the face image on the imaging plane of the image sensor 112. In the present embodiment, a CMOS image sensor is used as the image sensor 112. The imaging optical system 114 is formed by integrally combining a plurality of lenses and a diaphragm. The in-vehicle camera 110 corresponds to a face image capturing device.

The control device 200 is formed of a microcomputer that includes a CPU, a memory, a timer, and various electrical circuits. As is well known, the microcomputer can implement various functions depending on an employed program. The control device 200 according to the present embodiment has a function of emitting infrared light to the face of the driver by driving the light emitter 120, a function of acquiring image data on the face image by driving the image sensor 112, and a function of determining the driver condition (such as the awareness, aimlessness, and drowsiness of the driver) by analyzing the image data on the face image.

In FIG. 2, for the sake of convenience, a portion implementing the function of driving the light emitter 120 is designated as a "light emitter drive section 201", which is incorporated, for example, in the elements of the control device 200, namely, the CPU, program, and electrical circuits. Similarly, a portion implementing the function of acquiring image data with the image sensor 112 is designated as an "image acquisition section 202", and a portion implementing the function of determining the driver condition by analyzing the image data is designated as a "driver condition determination section 203".

FIG. 3 depicts a cross-section of the in-vehicle camera 110 to illustrate its general internal structure. The image sensor 112 is housed in a main body case 111 of the in-vehicle camera 110. The imaging optical system 114 is attached to the front of the main body case 111.

The imaging optical system 114 is structured by integrally assembling, for example, a plurality of lenses and an optical system diaphragm 114f. A thread formed on the outer circumference of the imaging optical system 114 is used to screw it into the main body case 111. Therefore, the distance between the imaging optical system 114 and the image sensor 112 can be fine-tuned by rotating the whole imaging optical system 114. In other words, focusing can be achieved.

The imaging optical system 114 illustrated in FIG. 3 includes three lenses and the diaphragm 114f. However, the number of lenses, the number of diaphragms 114f, and the positional relationship between the lenses and the diaphragm 114f may be changeable.

FIGS. 4A and 4B illustrate a principle on which focusing is achieved by fine-tuning the position of the imaging optical system 114 with respect to the image sensor 112. As mentioned above, the imaging optical system 114 includes a plurality of lenses. However, the plurality of lenses may be considered as an equivalent lens. Here, it is assumed that the focal length of the equivalent lens is f.

Let us assume that the imaging optical system 114 is positioned at a distance a from the imaging plane of the image sensor 112 as illustrated in FIG. 4A. The image of an object positioned at a distance A from the imaging optical system 114 is then formed on the imaging plane of the image sensor 112. It is known that the distance A satisfies the equation in FIG. 4B. Therefore, by moving the imaging optical system 114 toward or away from the image sensor 114, focusing can be achieved at a position (a point) at the distance A, which is determined on the basis of the prevailing distance a.

In the above case, the position at the distance A is the most focused point. Therefore, this position corresponds to the "focal point" of the imaging optical system 114.

A camera having a so-called zoom function is capable of changing the focusing distance A (the focal point of the imaging optical system) by changing the distance a or the equivalent focal length f. Therefore, as mentioned earlier with reference to FIG. 1, an image of the face can be formed on the imaging plane of the image sensor 112 by focusing at a position of the face of the driver even when the position of the driver's seat 4 is moved forward or rearward.

However, the in-vehicle camera 110 according to the present embodiment is a so-called fixed-focus camera. Therefore, the equivalent focal length f of the imaging optical system 114 and the distance a between the image sensor 112 and the imaging optical system 114 are fixed. Consequently, the focusing distance A (the focal point of the imaging optical system 114) cannot be changed even when the driver's seat 4 is repositioned to move the position of the face of the driver forward or rearward.

As such being the case, the fixed-focus in-vehicle camera 110 is generally adapted so as to decrease the aperture of the diaphragm 114f (increase the f-number) of the imaging optical system 114 and properly set the distance a between the image sensor 112 and the imaging optical system 114 (and thus properly position the focal point of the imaging optical system 114). As a result, a face image adequately sharp for practical use is obtained even when the face position of the driver is moved forward or rearward.

Figure 5A:
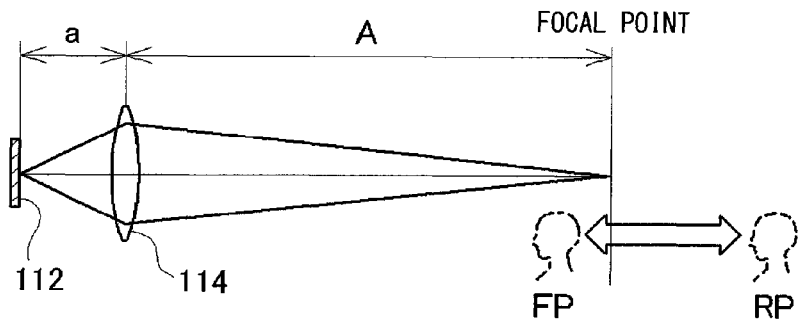
FIGS. 5A to 5C are diagrams illustrating a conventional idea that is employed to set a focus range of an imaging optical system by using a fixed-focus in-vehicle camera.
Figure 5B:
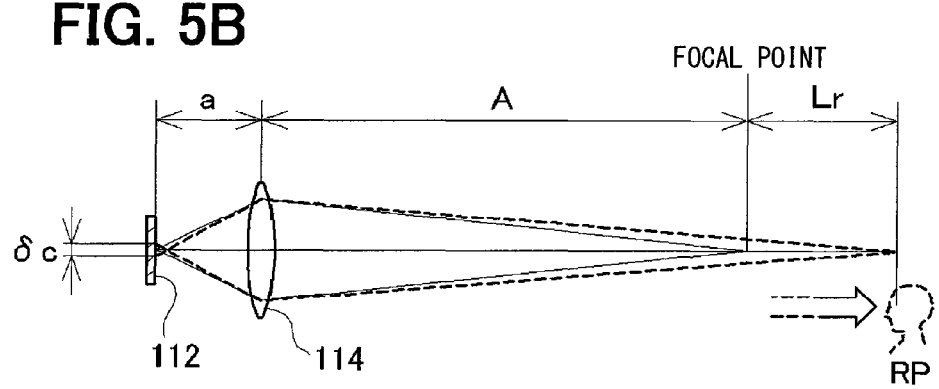
Figure 5C:
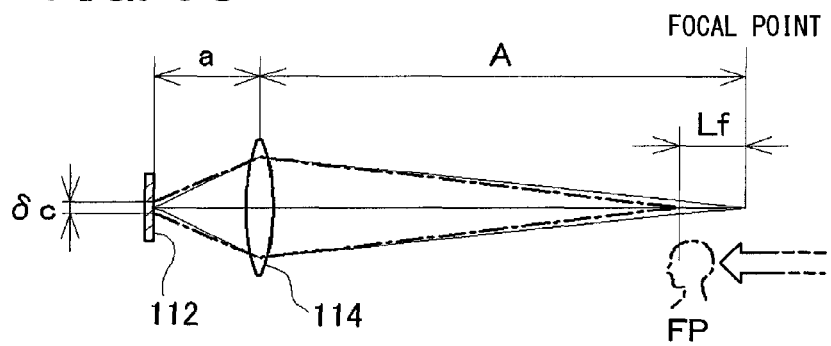

FIGS. 5A to 5C illustrate a conventional idea that has been employed to set the f-number and focal point of the imaging optical system 114 by using the fixed-focus in-vehicle camera 110. In the following description, when the driver's seat 4 is moved to the foremost limit position, the face position of the driver is referred to as the "foremost face position FP", and when the driver's seat 4 is moved to the rearmost limit position, the face position of the driver is referred to as the "rearmost face position RP". The foremost face position FP and the rearmost face position RP are determined as described below.

First of all, the foremost or rearmost limit position to which the driver's seat 4 can be moved is predetermined in a design stage of the vehicle 1. Obviously, the face position of the driver is not determined only by the position of the driver's seat 4 and varies, for example, with the physical size of the driver and a favorite driving posture of the driver.

In view of the above circumstances, data on measured face positions of various drivers were accumulated and incorporated into an international standard (for example, ISO 4513). This standard makes it possible to calculate the probability distribution of the face position with respect to the position of the driver's seat 4. When the position of the driver's seat 4 is determined, a region where the face of the driver exists can be determined with a certain probability (for example, with a probability of 90% or higher).

In the design stage of the in-vehicle camera 110, the foremost or rearmost limit position to which the driver's seat 4 is moved and the probability (for example, 95%) required at each of the foremost and rearmost limit positions are given as specifications. Therefore, when, for instance, the driver's seat 4 is moved forward, the region where the face of the driver exists at a probability not lower than the required probability when the driver's seat 4 is at a forward limit position can be determined in compliance with the international standard. Consequently, the foremost position in the determined region can be determined as the foremost face position FP.

Similarly, when the driver's seat 4 is moved rearward, the region where the face of the driver exists at a probability not lower than the required probability when the driver's seat 4 is at a rearmost limit position can be determined in compliance with the international standard. Consequently, the rearmost position in the determined region can be determined as the rearmost face position RP.

A method of determining the foremost face position FP and the rearmost face position RP in compliance with the international standard has been described. However, if the movement range of the face position that is moved by the movement of the driver's seat 4 can be determined, the international standard need not always be complied with. The foremost face position FP and the rearmost face position RP may be determined in compliance, for example, with a country-specific standard or a standard established by a manufacturer of the vehicle 1.

Obviously, the fixed-focus in-vehicle camera 110 cannot adjust a focusing position (the focal point of the imaging optical system 114) in compliance with a moved face position of the driver. However, as far as the face position of the driver is within the range from the foremost face position FP to the rearmost face position RP, it is demanded that a sharp face image be obtained.

As such being the case, it is considered that a region where focusing is considered practically achieved is provided for the fixed-focus in-vehicle camera 110. This region extends from a point before the focusing position (focal point) to a point after it. In this region, perfect focusing is not achieved (so that an obtained image is slightly blurred), but can be handled as a region where focusing is practically achieved because the blurring is slight and does not constitute a practical problem. The "region that can be handled as a region where focusing is practically achieved" is hereinafter referred to as the "focus region (or focus range)".

If the focal point of the imaging optical system 114 is positioned between the foremost face position FP and the rearmost face position RP as indicated in FIG. 5A, the focus range where focusing is practically achieved extends from a point before the focal point to a point after it. Therefore, the foremost face position FP and the rearmost face position RP should be included in the focus range. The size of the focus range may be determined by using a "rear depth of field" and a "front depth of field", which are described below.

First of all, the rear depth of field will be described with reference to in FIG. 5B. If, for example, a point light source is placed at the distance A from the imaging optical system 114 (at the focal point of the imaging optical system 114), a point image should be formed on the imaging plane of the image sensor 112 when the aberration of the imaging optical system 114 is disregarded. Subsequently, if the point light source is moved away from the imaging optical system 114 (hereinafter referred to as "rearward"), the image formed on the imaging plane of the image sensor 112 is circularly blurred and turned into a circular image. The circular image is called a "circle of confusion". Further, if the point light source is moved rearward an increased distance, the blurring increases to increase the circle of confusion.

As such being the case, when the diameter δc of a permissible circle of confusion is set, it is possible to determine a maximum movement amount by which the light source can be moved rearward. The rear depth of field denotes this maximum movement amount. It is known that the rear depth of field Lr can be calculated from Equation (1) in FIG. 5B. In Equation (1), "δc" is the diameter of the permissible circle of confusion, "f" is the equivalent focal length of the imaging optical system 114, "A" is the distance between the imaging optical system 114 to the focal point, and "FNo" is the f-number of the imaging optical system 114. As indicated in Equation (1), the greater the f-number (the smaller the aperture of the optical system), the greater the rear depth of field Lr.

Basically the same holds true if the point light source is moved toward the imaging optical system 114 (hereinafter referred to as "forward"). More specifically, as indicated in FIG. 5C, moving the point light source forward blurs the image formed on the imaging plane of the image sensor 112 and increases the circle of confusion. This makes it possible to determine the movement amount of the point light source (front depth of field) that makes the size of the circle of confusion equal to that of the permissible circle of confusion. Further, the front depth of field Lf can be calculated from Equation (2) in FIG. 5C. It should be noted that "δc", "f", "A", and "FNo" in Equation (2) are the same as the counterparts in Equation (1). Equation (2) is similar to Equation (1) in that the greater the f-number (the smaller the aperture of the optical system) the greater the front depth of field Lf. However, the front depth of field Lf increases in smaller increments than the rear depth of field Lr.

As is obvious from the above explanation, the focus range (where focusing may be considered practically achieved) is the sum of the rear depth of field Lr, which extends rearward from the focal point of the imaging optical system 114, and the front depth of field Lf, which extends forward from the focal point of the imaging optical system 114.

As mentioned above, the rear depth of field Lr and the front depth of field Lf both increase with an increase in the f-number. This increases the focus range. Meanwhile, when the f-number increases (the area of opening in the diaphragm 114f depicted in FIG. 3 decreases), the intensity of light incident on the imaging plane of the image sensor 112 decreases to make it difficult to obtain a bright face image. This makes it necessary to increase the intensity of light incident on the face of the driver. In that sense, it is preferred that the f-number be as small as possible.

In view of the above idea, it is ideal that the f-number of the imaging optical system 114 and the distance a between the image sensor 112 and the imaging optical system 114 be set to make the focus range identical with the range between the foremost face position FP and the rearmost face position RP.

For a conventional fixed-focus in-vehicle camera 110, the f-number of the imaging optical system 114 and the distance a between the image sensor 112 and the imaging optical system 114 are set so as to obtain an appropriate focus range on the basis of the above idea.

As is obvious from a comparison between Equation (1) in FIG. 5B and Equation (2) in FIG. 5C, the rear depth of field Lr is always greater than the front depth of field Lf. Therefore, as depicted in FIG. 5A, the conventional fixed-focus in-vehicle camera 110 is configured so that the focal point of the imaging optical system 114 is disposed forward of the intermediate position between the foremost face position FP and the rearmost face position RP (disposed relatively close to the imaging optical system 114).

For ease of understanding, the above explanation has been made on the assumption that the employed light source has no physical size (is a point light source) and that the imaging optical system 114 has no aberration. However, the light source has always a certain size and a certain shape. For example, a small white circular disc having a diameter of 1 centimeter may be brightly illuminated and used instead of the point light source.

Further, optical systems always have aberration. Therefore, even when a circular disc is photographed, a circular image is not always obtained and the diameter of a circle of confusion cannot always be measured. Thus, the area of the obtained image can be measured to calculate the diameter of an equivalent circle of confusion that has the same area as the obtained image.

Figure 6:
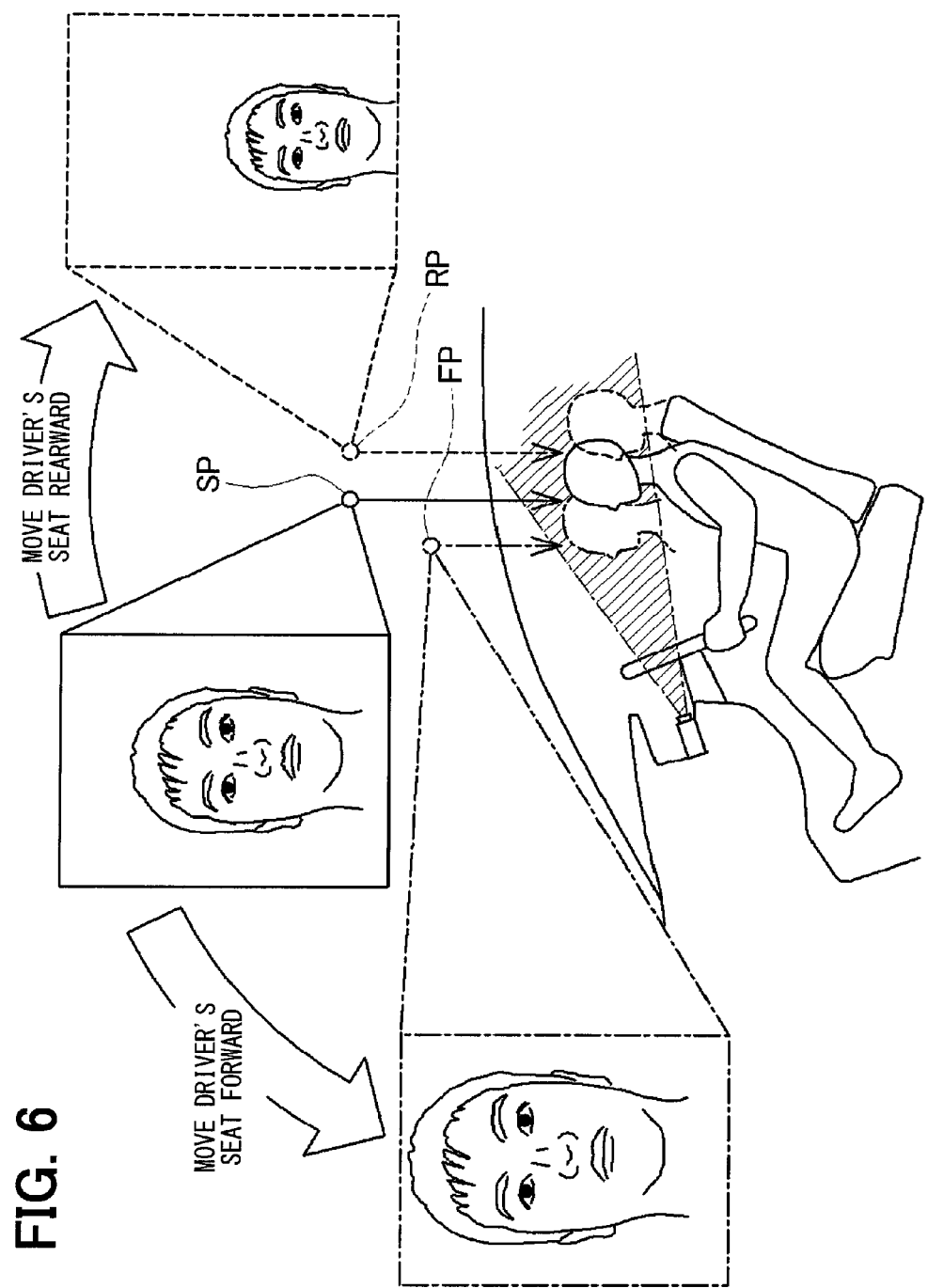
FIG. 6 is a diagram illustrating face images that are obtained when the focus range is set based on the conventional idea.

FIG. 6 illustrates face images that are obtained when the f-number of the fixed-focus in-vehicle camera 110 and the distance a are set based on the above-described conventional idea. A sharp face image can be captured not only when the face of the driver is at a standard face position SP, but also when the face of the driver is at the foremost face position FP or at the rearmost face position RP.

A predetermined process is performed on the above face image to determine the driver condition (such as the awareness, aimlessness, and drowsiness of the driver). As mentioned above, a sharp face image is always obtained without regard to the face position of the driver. In the past, therefore, it was believed that the driver condition could be accurately determined at all times. However, the accuracy of determination may decrease. Subsequently, the process of determining the driver condition from a face image will be outlined in preparation for describing the cause of a decrease in the accuracy of determination, and then the cause of a possible decrease in the accuracy of determination will be described.

B. Driver Condition Determination Process

FIG. 7 is a flowchart illustrating a driver condition determination process. This process is performed by the control device 200 of the driver condition determination device 10.

The driver condition determination process is started by capturing an image including the image of the face of the driver (S100). In other words, the light emitter 120 is driven to emit light to the face of the driver and obtain an image formed on the imaging plane of the image sensor 112. As mentioned earlier, the light emitter 120 emits light ranging from the infrared light to the long wavelength side of visible light. The light emitter drive section 201 drives the light emitter 120. The image acquisition section 202 controls the exposure time and exposure timing of the image sensor 112 and reads image data from the image sensor 112.

Next, the control device 200 performs the following process by using the driver condition determination section 203. First of all, a face region where an image of the face (a face image) is shown is detected from the image captured by the in-vehicle camera 110 (S101). The face region can be detected by extracting face features from the image. As illustrated in FIG. 6, a large face region is detected from an image captured at the foremost face position FP, and a small face region is detected from an image captured at the rearmost face position RP.

Figure 8A:
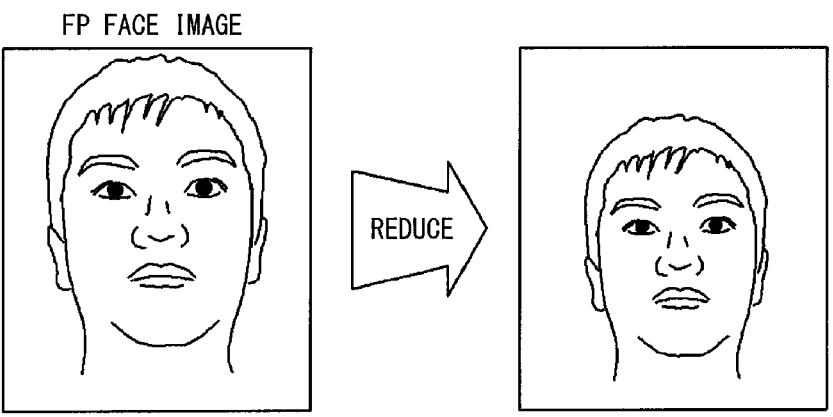
FIGS. 8A to 8C are diagrams illustrating how a face image is normalized prior to driver condition determination.
Figure 8B:
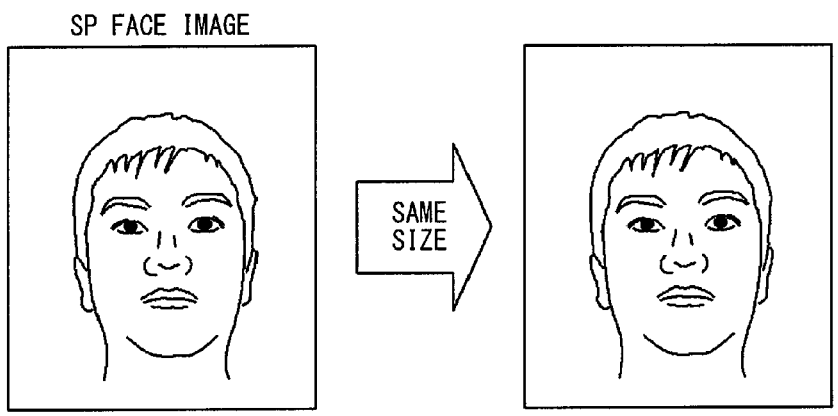
Figure 8C:
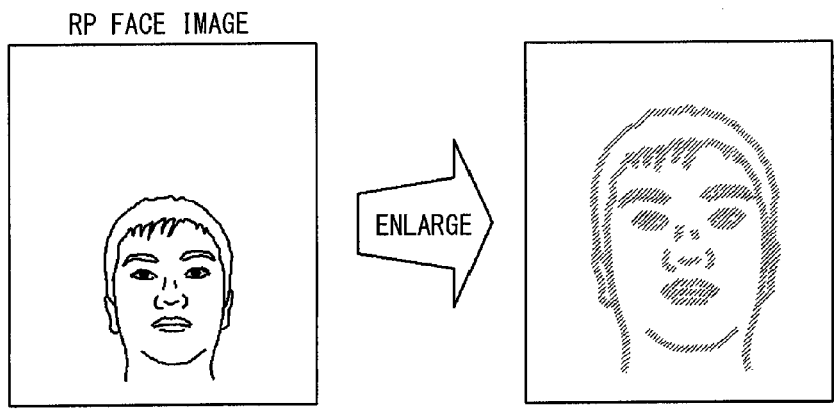

Subsequently, a process called "normalization" is performed to normalize the face image by enlarging or reducing the image of the detected face region (S102). FIGS. 8A to 8C illustrate how a face image is normalized. A face image having substantially the same size as a face image captured at the standard face position SP is generated by reducing the face image captured at the foremost face position FP through the use of a computer or by enlarging the face image captured at the rearmost face position RP through the use of a computer.

For example, an eye position, eyelids, and pupils are detected from the face image normalized as described above in order to detect the degree of eye opening (the size of an eye opening) and the behavior of eyelids (eyelid positions, blinking speed, and blinking intervals) (S103). The degree of eye opening and the eyelid behavior may be detected by various well-known methods.

Next, the driver condition (such as awareness and aimlessness) is determined on the basis of the degree of eye opening and the eyelid behavior (S104). Various well-known methods may also be used to determine the driver condition. On the basis of the result of the above determination, the control device 200, for example, issues a warning to the driver.

Here, it is found that the reason why the accuracy of driver condition determination may decrease although a sharp face image is constantly obtained is that the blurring of an image is increased when an image including the image of a face is used to normalize a face image, that is, the image of a region where the image of a face is shown (S102 in FIG. 7). This will be described below with reference to FIGS. 8A to 8C.

FIGS. 8A to 8C relates to the foremost face position FP, the standard face position SP, and the rearmost face position RP, respectively, and illustrate a face image captured by the in-vehicle camera 110 and a normalized face image.

When unnormalized face images on the left side of FIGS. 8A to 8C, which are obtained in three different situations, namely, at the foremost face position FP, at the standard face position SP, and at the rearmost face position RP, are compared against each other, it is found that the face image obtained at the standard face position SP, which is closest to the focal point of the imaging optical system 114, is the sharpest. However, the face images obtained at the foremost face position FP and the rearmost face position RP are adequately sharp (although they are a bit more blurry than the face image obtained at the standard face position SP). The reason is that the diameter of the circle of confusion at the foremost face position FP and at the rearmost face position RP is smaller than the diameter δc of the permissible circle of confusion, as described earlier with reference to FIGS. 5A to 5C.

However, the face image obtained at the rearmost face position RP is enlarged by normalization. This increases the blurring of the face image (see FIG. 8C). As a result, the degree of eye opening and the eyelid behavior are detected from the blurred face image (see S103 in FIG. 7). It is conceivable that the accuracy of driver condition determination may decrease because the blurring of the face image obtained at the rearmost face position RP increases during normalization although a sharp image is captured by the in-vehicle camera 110.

Meanwhile, the face image obtained at the foremost face position FP is reduced by normalization. Therefore, even if the face image captured by the in-vehicle camera 110 is blurred, it can be considered that the blurring decreases during normalization.

In view of the above findings, the in-vehicle camera 110 according to the present embodiment sets the focus range (f-number and focal point) of the imaging optical system 114 on the basis of an idea that is entirely different from the idea of a conventional fixed-focus in-vehicle camera.

Figure 9A:
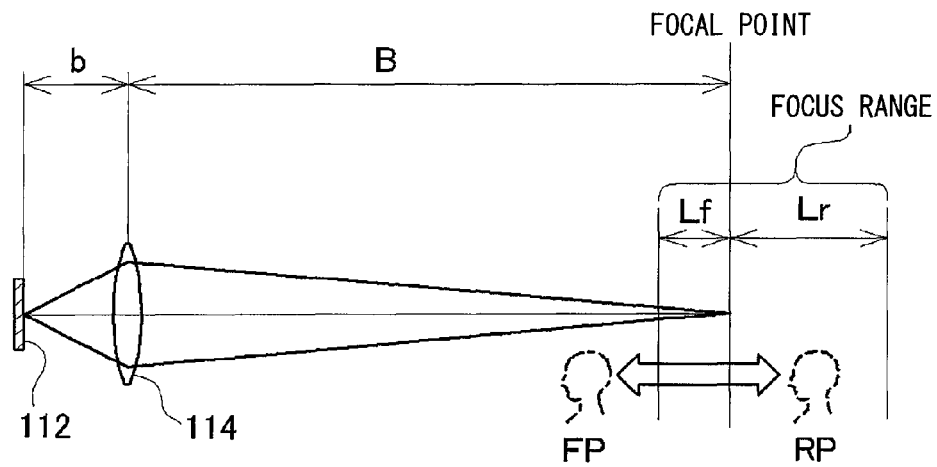
FIGS. 9A and 9B are diagrams illustrating an idea that is employed to set the focus range of the imaging optical system by using an in-vehicle camera according to the embodiment.
Figure 9B:
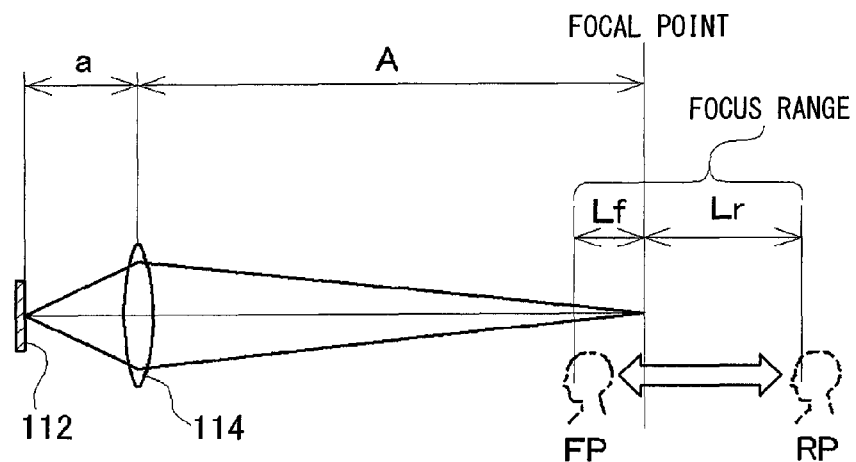

C. Idea of Setting the Focus Range of the Imaging Optical System 114 According to the Present Embodiment FIGS. 9A and 9B illustrate a basic idea of focus range setup that is employed by the imaging optical system 114 according to the embodiment. As illustrated in FIG. 9A, the focus range set by the in-vehicle camera 110 according to the present embodiment is moved rearward, that is, in a direction away from the in-vehicle camera 110 as compared to the movement range of the face position of the driver (the range between the foremost face position FP and the rearmost face position RP).

For purposes of reference, in FIG. 9B illustrates the focus range that is set based on the conventional idea. As the focal point according to the present embodiment illustrated in FIG. 9A is different from a conventional focal point illustrated in FIG. 9B, the focus range calculated by Equation (1) in FIG. 5B does not exactly coincide in size with the focus range calculated by Equation (2) in FIG. 5C. In both of these cases, however, the focus range is such that the diameter of the circle of confusion created by a point light source is not larger than the diameter δc of the permissible circle of confusion.

As illustrated in FIG. 9B, the focus range based on the conventional idea includes the range between the foremost face position FP and the rearmost face position RP. This makes it possible to capture a sharp face image without regard to the face position of the driver.

Meanwhile, the focus range based on the idea according to the present embodiment, which is illustrated in FIG. 9A, does not include a range close to the foremost face position FP. In other words, the focus range set in the present embodiment is unable to obtain a sharp face image when the driver moves the driver's seat 4 forward, for example, to the foremost face position FP.

Further, the idea according to the present embodiment also differs from the conventional idea in the position of the focal point of the imaging optical system 114. In other words, as is obvious from the comparison between Equation (1) in FIG. 5B and Equation (2) in FIG. 5C, the front depth of field Lf is always smaller than the rear depth of field Lr. Therefore, the focal point of the imaging optical system 114 is always positioned forward of the intermediate position of the focus range (positioned relatively close to the imaging optical system 114). According to the conventional idea, the focus range is set so that it is substantially equal to the range between the foremost face position FP and the rearmost face position RP. Consequently, the focal point is always positioned forward of the intermediate position between the foremost face position FP and the rearmost face position RP (positioned relatively close to the imaging optical system 114).

Meanwhile, the focus range based on the idea according to the present embodiment is positioned rearward of the range between the foremost face position FP and the rearmost face position RP (positioned relatively far from the imaging optical system 114). Therefore, the focal point of the imaging optical system 114 could be positioned at or rearward of the intermediate position between the foremost face position FP and the rearmost face position RP. In other words, when the focal point is positioned as described above (positioned at or rearward of the intermediate position between the foremost face position FP and the rearmost face position RP), it is conceivable that the focus range is set based on the idea according to the present embodiment.

Even if the focus range is set based on the idea according to the present embodiment, the focal point of the imaging optical system 114 could be positioned forward of the intermediate position between the foremost face position FP and the rearmost face position RP. In such a situation, the focal point does not indicate which of the two different ideas is used to set the focus range.

However, even if the above situation arises, observing the size of the circle of confusion at the foremost face position FP and at the rearmost face position RP makes it possible to determine which of the two different ideas is used to set the focus range.

Figure 10A:
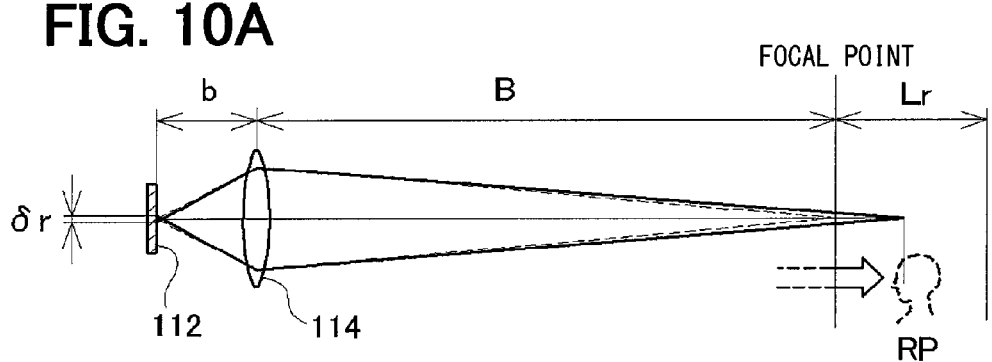
FIGS. 10A and 10B are diagrams illustrating the fact that a smaller circle of confusion is obtained at a rearmost face position when the focus range is set based on the idea according to the embodiment than when the focus range is set based on a conventional idea.
Figure 10B:
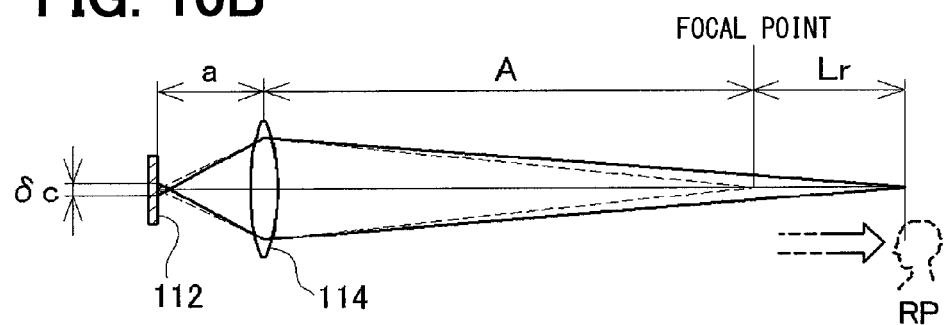

FIGS. 10A and 10B illustrate the comparison of the size of the circle of confusion at the rearmost face position RP between the case where the focus range is set based on the idea according to the present embodiment and the case where the focus range is set based on the conventional idea. FIG. 10A illustrates the case where the focus range is set based on the idea according to the present embodiment. FIG. 10B illustrates the case where the focus range is set based on the conventional idea.

When the focus range is set based on the conventional idea, the rear end of the focus range (which is positioned rearward of the focal point and away from the focal point by a distance equivalent to the rear depth of field Lr) is positioned at substantially the same position as the rearmost face position RP as illustrated in FIG. 10B. Therefore, the diameter of the circle of confusion at the rearmost face position RP is substantially equal to the diameter δc of the permissible circle of confusion.

Meanwhile, when the focus range is set based on the idea according to the present embodiment, the rearmost face position RP is closer to the focal point of the imaging optical system 114 than in the case of FIG. 10B, as illustrated in FIG. 10A. Therefore, the diameter of the circle of confusion δr at the rearmost face position RP is smaller than the diameter δc of the permissible circle of confusion.

As is obvious from the above description, when the diameter of the circle of confusion δr at the rearmost face position RP is smaller than the diameter δc of the permissible circle of confusion, it is conceivable that the focus range is set based on the idea according to the present embodiment.

Figure 11A:
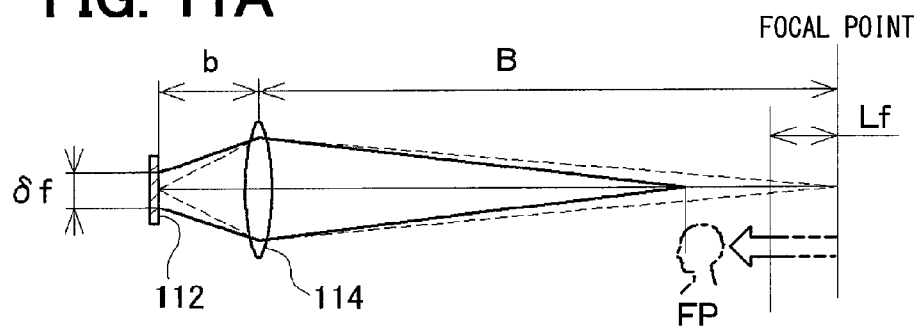
FIGS. 11A and 11B are diagrams illustrating the fact that a larger circle of confusion is obtained at a foremost face position when the focus range is set based on the idea according to the embodiment than when the focus range is set based on the conventional idea.
Figure 11B:
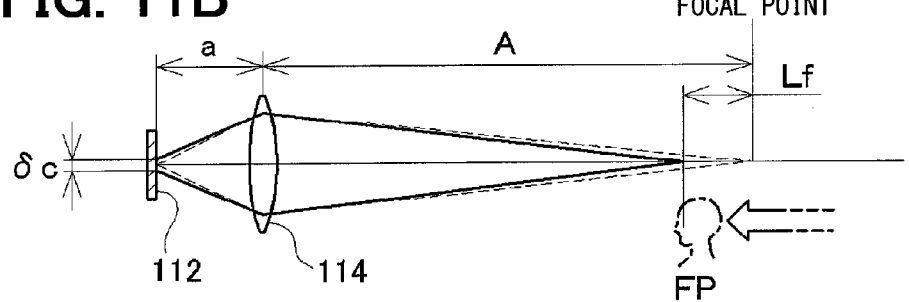

FIGS. 11A and 11B illustrate the comparison of the size of the circle of confusion at the foremost face position FP between the case where the focus range is set based on the idea according to the present embodiment and the case where the focus range is set based on the conventional idea. FIG. 11A illustrates the case where the focus range is set based on the idea according to the present embodiment. FIG. 11B illustrates the case where the focus range is set based on the conventional idea.

When the focus range is set based on the conventional idea, the diameter of the circle of confusion at the foremost face position FP is substantially equal to the diameter δc of the permissible circle of confusion as illustrated in FIG. 11B.

Meanwhile, when the focus range is set based on the idea according to the present embodiment, the foremost face position FP is out of the focus range as illustrated in FIG. 11A. Therefore, the diameter of the circle of confusion δf at the foremost face position FP is larger than the diameter δc of the permissible circle of confusion.

As is obvious from the above description, when the diameter of the circle of confusion δf at the foremost face position FP is larger than the diameter δc of the permissible circle of confusion, it is conceivable that the focus range is set based on the idea according to the present embodiment.

The above description has been made on the assumption that whether the focus range is set based on the idea according to the present embodiment is determined by comparing the diameter of the circle of confusion δr at the rearmost face position RP or the diameter of the circle of confusion δf at the foremost face position FP against the diameter δc of the permissible circle of confusion.

However, whether the focus range is set based on the idea according to the present embodiment can be determined more clearly by comparing the diameter of the circle of confusion δr at the rearmost face position RP and the diameter of the circle of confusion δf at the foremost face position FP. More specifically, when the focus range is set based on the conventional idea, the diameter of the circle of confusion at the rearmost face position RP and the diameter of the circle of confusion at the foremost face position FP are both substantially equal to the diameter δc of the permissible circle of confusion, and thus substantially equal to each other (see FIG. 10B and FIG. 11B).

Meanwhile, when the focus range is set based on the idea according to the present embodiment, the diameter of the circle of confusion δr at the rearmost face position RP is smaller than the diameter δc of the permissible circle of confusion (see FIG. 10A), and the diameter of the circle of confusion δf at the foremost face position FP is larger than the diameter δc of the permissible circle of confusion (see FIG. 11A). Therefore, it is obvious that the diameter of the circle of confusion δf at the foremost face position FP is larger than the circle of confusion δr at the rearmost face position RP.

Consequently, when the circle of confusion δr at the rearmost face position RP and the circle of confusion δf at the foremost face position FP are definitely different from each other, it is conceivable that the focus range is set based on the idea according to the present embodiment.

Figure 12A:
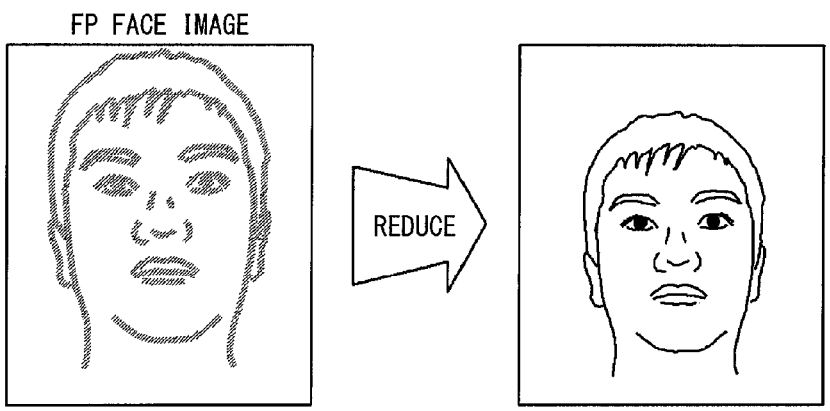
FIGS. 12A to 12C are diagrams illustrating a face image that is obtained when the focus range is set based on the idea according to the embodiment.
Figure 12B:
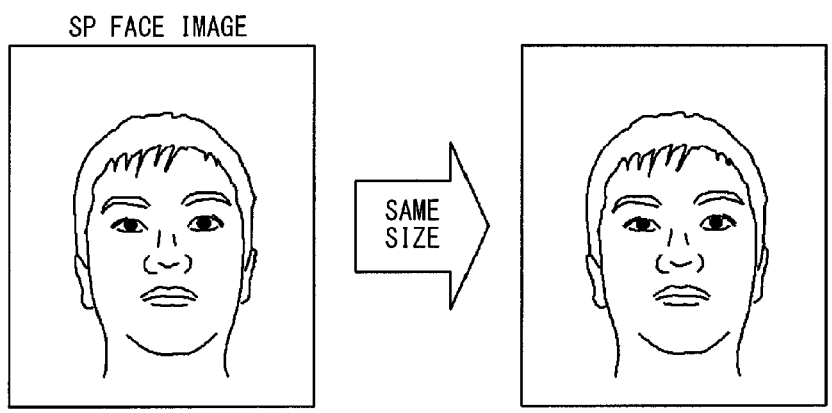
Figure 12C:
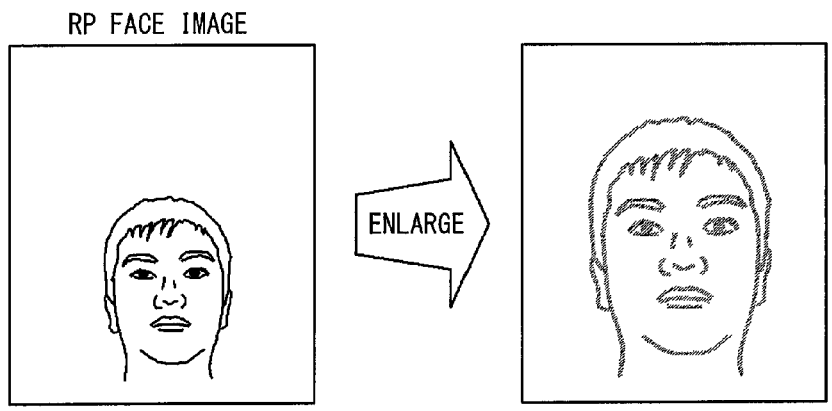

FIGS. 12A to 12C illustrate how a face image is normalized when the focus range is set based on the idea according to the present embodiment. FIG. 12A relates to a face image obtained at the foremost face position FP and illustrates an unnormalized face image and a normalized face image. FIG. 12B relates to a face image obtained at the standard face position SP and illustrates an unnormalized face image and a normalized face image. FIG. 12C relates to a face image obtained at the rearmost face position RP and illustrates an unnormalized face image and a normalized face image.

As illustrated, the face image obtained at the foremost face position FP is blurred before normalization. This relates to the fact that when the focus range is set based on the idea according to the present embodiment, the circle of confusion δf at the foremost face position FP is larger than the diameter δc of the permissible circle of confusion (see FIG. 11A). However, as the blurring of the face image obtained at the foremost face position FP is decreased by normalization, the normalized face image is as sharp as the face image obtained at the standard face position SP.

Meanwhile, the blurring of the face image obtained at the rearmost face position RP is increased by normalization. However, when the focus range is set based on the idea according to the present embodiment, a sharper face image is obtained at the rearmost face position RP than when the focus range is set based on the conventional idea. This relates to the fact that when the focus range is set based on the idea according to the present embodiment, the circle of confusion δr at the rearmost face position RP is smaller than the diameter δc of the permissible circle of confusion (see FIG. 10A). Therefore, even after normalization, it is possible to obtain a face image that is as sharp as the face image obtained at the standard face position SP, as illustrated in FIG. 12C.

Further, as is obvious from the above description, when the reduction ratio for normalization at the foremost face position FP is Kf and the enlargement ratio for normalization at the rearmost face position RP is Kr, an ideal method of setting the focus range is as described below. The focus range should ideally be set so that the diameter of the circle of confusion δf at the foremost face position FP is approximately Kf times the diameter δc of the permissible circle of confusion (or smaller), and that the diameter of the circle of confusion δr at the rearmost face position RP is approximately 1/Kr times the diameter δc of the permissible circle of confusion (or smaller).

As described above, when the focus range is set based on the idea according to the present embodiment, a sharp face image is constantly obtained after normalization even if a face image (unnormalized) captured by the in-vehicle camera 110 is blurred. Consequently, the driver condition can be accurately determined at all times without regard to the face position of the driver.

Further, as the blurring of the face image obtained at the foremost face position FP can be decreased by normalization, it does not matter whether the face image captured by the in-vehicle camera 110 is blurred. Consequently, as the focus range can be made narrower than in the past, the f-number of the imaging optical system 114 can be set to a smaller value. For the imaging optical system 114 according to the present embodiment, an f-number smaller than "2.0" (for example, 1.8) is set. As a result, the in-vehicle camera 110 can capture a face image that is brighter than in the past. Therefore, a light source having a lower light intensity than in the past can be used for the light emitter 120 for the in-vehicle camera 110.

Moreover, the intensity of light emitted from the light emitter 120 decreases in reverse proportion to the square of distance. Therefore, an image obtained at the rearmost face position RP is darker (lower in brightness) than an image obtained at the standard face position SP or at the foremost face position FP. Thus, the brightness of the obtained image needs to be accentuated. Further, if the obtained image includes noise, the noise may be accentuated as well. However, the focal point of the imaging optical system 114 according to the present embodiment is positioned toward the rearmost face position RP. Therefore, light collection efficiency increases to obtain a bright face image. In addition, a face image having a small amount of noise can be obtained because focusing is achieved. As a result, the driver condition can be determined accurately in a consistent manner.

As described above, when the focus range is set based on the idea according to the present embodiment, various advantages mentioned above can be obtained. Further, it has been described that whether the focus range is set based on the idea according to the present embodiment can be determined by observing the positional relationship between the focal point of the imaging optical system 114, the foremost face position FP, and the rearmost face position RP and the size of the circle of confusion at the foremost face position FP and at the rearmost face position RP.

However, whether the focus range is set based on the idea according to the present embodiment can also be determined by observing the MTF (Modulation Transfer Function), which is used to evaluate an optical system.

In short, the MTF is obtained by applying a transfer function (frequency transfer function), which relates to a frequency along the time axis, to a frequency along the length axis (spatial frequency). In other words, the frequency along the time axis represents the number of times an increase/decrease is repeated during a fixed period of time, and the frequency transfer function represents the amount of increase/decrease in the amplitude of an output with respect to the input of a frequency.

Meanwhile, the spatial frequency represents the number of times the contrast of an image increases/decreases within a predetermined distance. The MTF represents the degree of storage of the contrast that is output (an image formed by an optical system in this instance) with respect to the input of a certain spatial frequency (an image in this instance). If, for example, a subject image having 10 thin black lines within a width of 1 mm is formed, the thin black lines can be distinguished as far as a sufficient contrast is stored. However, if the contrast is significantly decreased, the resulting image looks like a blurred image so that the thin black lines are difficult to distinguish. Thus, the degree of blurring can be objectively evaluated by using the MTF.

Figure 13A:
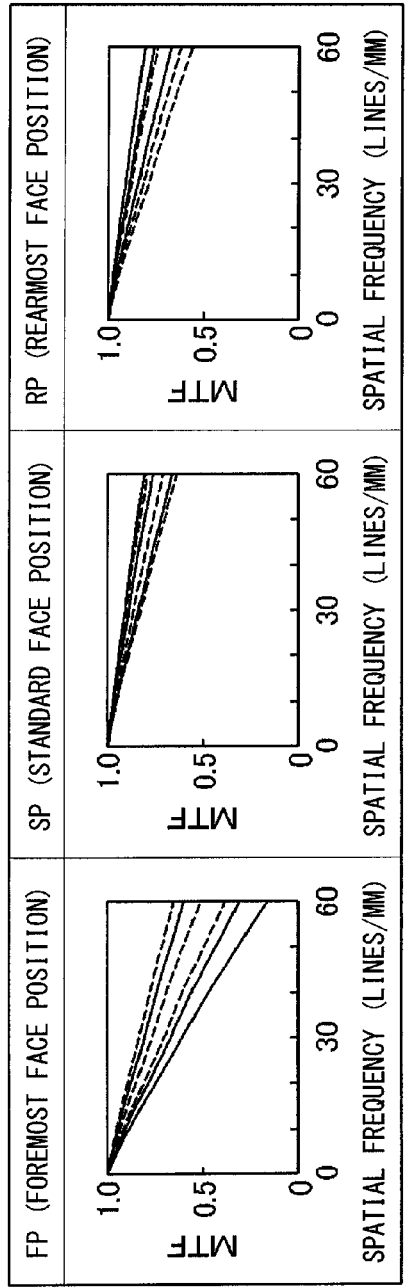
FIGS. 13A and 13B are diagrams illustrating the result of comparison of an MTF of the imaging optical system between the case where the focus range is set based on the idea according to the embodiment and the case where the focus range is set based on the conventional idea.
Figure 13B:
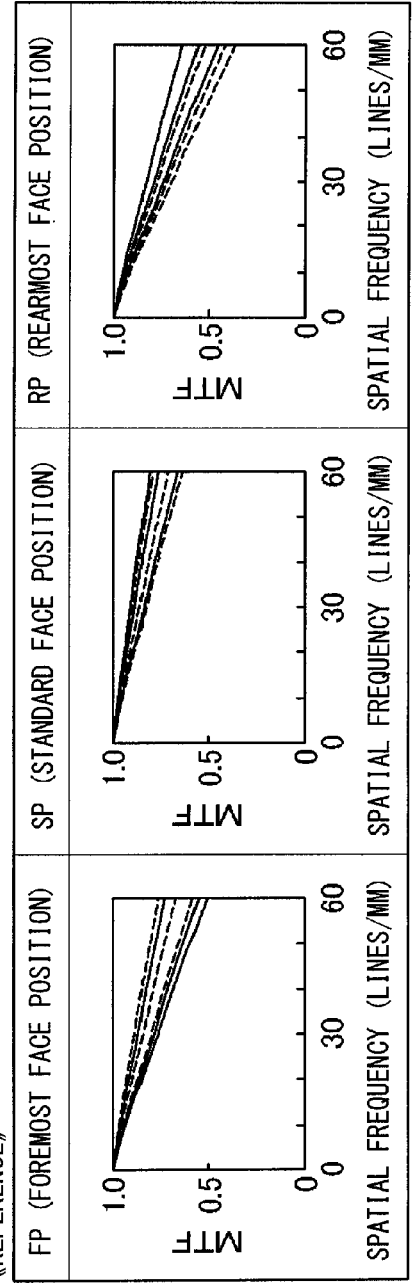

FIG. 13A illustrates the result of MTF evaluation of the imaging optical system 114 that is obtained when the focus range is set based on the idea according to the embodiment. FIG. 13B illustrates the result of evaluation of the MTF that is obtained when the focus range is set based on the conventional idea.

First of all, how to understand the information provided in FIGS. 13A and 13B will be described. As mentioned earlier, the MTF represents the degree of storage of image contrast with respect to an image having a certain spatial frequency (for example, then number of black lines drawn within a width of 1 mm). In other words, the MTF indicates whether an image having distinguishable black lines is obtained. It is obvious that the degree of black line distinguishableness varies with the distance to the position of an image to be captured. In relation to this fact, in FIGS. 13A and 13B each illustrate the result of MTF evaluation of three positions, namely, the foremost face position FP, the standard face position SP, and the rearmost face position RP.

Further, even if the position of the image to be captured remains unchanged, the degree of black line distinguishableness varies when the spatial frequency of the image (the number of black lines drawn within a width of 1 mm) changes. In relation to this fact, in FIGS. 13A and 13B each illustrate the result of MTF evaluation of the three positions within a spatial frequency range of 0 lines/mm to 60 lines/mm.

A spatial frequency of 0 lines/mm represents a black solid image. Even if such a black solid image is blurred and used as an original image, the same black solid image as the original image will be obtained. In such an instance, the value of the MTF is "1.0", which indicates that the contrast is completely stored. If the spatial frequency (the number of black lines drawn within a width of 1 mm) increases, the MTF decreases as the black lines gradually become more difficult to distinguish from each other.

Further, an image obtained at a position close to the optical axis of an optical system and an image obtained at a position apart from the optical axis differ in the degree of black line distinguishableness. In addition, black lines oriented in a radial direction with respect to the optical axis and black lines oriented in a circumferential direction with respect to the optical axis and black lines also differ in the degree of black line distinguishableness. As such being the case, the MTF is evaluated at various positions with respect to the optical axis and in two different situations, namely, a situation where the black lines are oriented in a radial direction and a situation where the black lines are oriented in a circumferential direction.

FIGS. 13A and 13B illustrate a plurality of MTFs that are depicted in graphs of three positions (for example, in a graph of the foremost face position FP). The reason is that the MTF is evaluated with respect to the optical axis at a plurality of positions. An MTF indicated by a solid line in a graph is the MTF concerning an image capturing target whose black lines are oriented in a radial direction. An MTF indicated by a broken line in a graph is the MTF concerning an image capturing target whose black lines are oriented in a circumferential direction.

For convenience of explanation, first of all, the MTF obtained when the focus range is set based on the conventional idea will be described with reference to FIG. 13B. According to the conventional idea, the focus range is set so that the circles of confusion at the foremost face position FP and the rearmost face position RP are not larger than the diameter δc of the permissible circle of confusion (see FIGS. 5A to 5C). Accordingly, when the focus range is set based on the conventional idea, the MTF at the foremost face position FP and the MTF at the rearmost face position RP are not significantly lower than the MTF at the standard face position SP.

Further, the value of the MTF at the rearmost face position RP is smaller than the value of the MTF at the foremost face position FP. For both the foremost face position FP and the rearmost face position RP, the size of the circle of confusion is set to be substantially the same as the size of the permissible circle of confusion. However, the MTF at the rearmost face position RP is lower than the MTF at the foremost face position FP for the following reason. As the rearmost face position RP is at a more distant place than the foremost face position FP, the resulting image should intrinsically be relatively small. Nevertheless, the circle of confusion at the rearmost face position RP is of the same size as the circle of confusion at the foremost face position FP. It signifies that blurring is more permitted by the rearmost face position RP than by the foremost face position FP. That is why the MTF at the rearmost face position RP is lower than the MTF at the foremost face position FP.

Meanwhile, when the focus range is set based on the idea according to the present embodiment, the tendency of the MTF is completely different from that in the past. More specifically, the MTF at the foremost face position FP is significantly lower than the MTF at the standard face position SP as illustrated in FIG. 13A. The MTF at the rearmost face position RP is a bit lower than the MTF at the standard face position SP. As a result, when the focus range is set based on the idea according to the present embodiment, the MTF at the foremost face position FP is lower than the MTF at the rearmost face position RP in marked contrast to the case where the focus range is set based on the conventional idea.

Consequently, when the MTF at the foremost face position FP is lower than the MTF at the rearmost face position RP, it is conceivable that the focus range is set based on the idea according to the present embodiment.

As illustrated in FIGS. 13A and 13B, a plurality of MTFs are obtained from the imaging optical system 114 by varying the position relative to the optical axis and the orientation of the black lines. Therefore, when the magnitude relationship between an MTF at the foremost face position FP and an MTF at the rearmost face position RP is determined, the determined magnitude relationship could vary depending on which one of a plurality of MTFs at the foremost face position FP is compared against which one of a plurality of MTFs at the rearmost face position RP. Eventually, a complementary explanation of the above matter will be given.

When a plurality of MTFs are obtained from the foremost face position FP and from the rearmost face position RP as illustrated in FIGS. 13A and 13B, an MTF representative of the MTFs obtained from the foremost face position FP and an MTF representative of the MTFs obtained from the rearmost face position RP can be compared. The lowest MTF among the MTFs of the foremost face position FP and the lowest MTF among the MTFs of the rearmost face position RP may be used as the representative MTFs. Alternatively, average MTFs may be calculated from the MTFs of the foremost face position FP and the rearmost face position RP and used as the representative MTFs.

Figure 14:
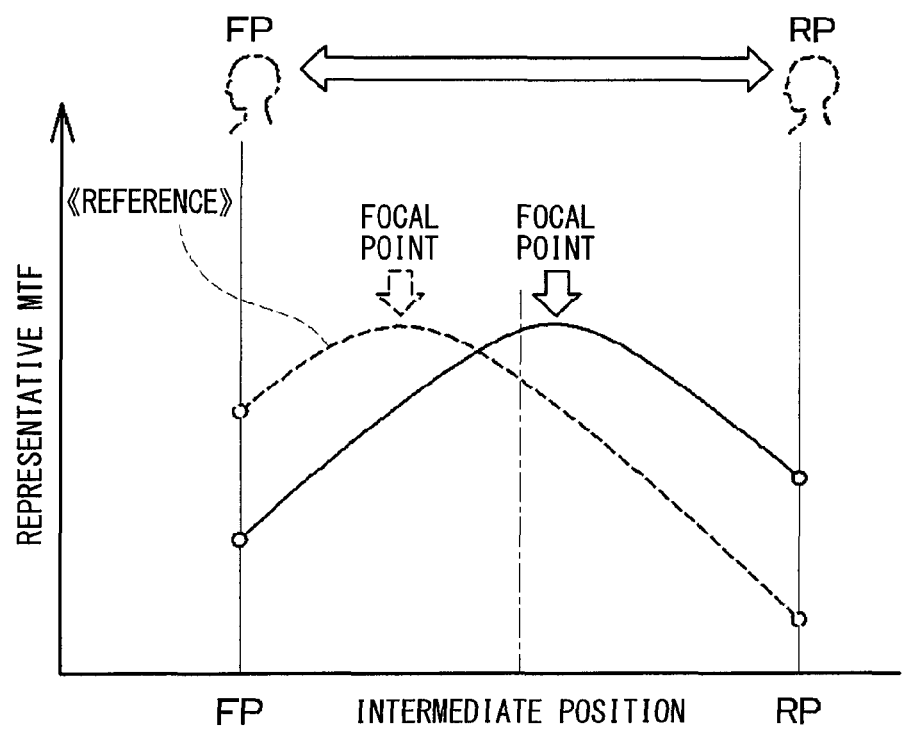
FIG. 14 is a diagram illustrating a method of comparison of a representative MTF between the case where the focus range is set based on the idea according to the embodiment and the case where the focus range is set based on the conventional idea.

Even when a plurality of MTFs are obtained, their representative MTF may be used to obtain the relationship illustrated in FIG. 14. A solid line depicted in FIG. 14 indicates a representative MTF that is obtained when the focus range is set based on the idea according to the present embodiment. A broken line depicted in FIG. 14 indicates a representative MTF that is obtained when the focus range is set based on the conventional idea. Therefore, using these representative MTFs for comparison purposes makes it possible to accurately determine whether the focus range of the imaging optical system 114 is set based on the idea according to the present embodiment.

While the embodiment has been described, the present disclosure is not limited to the above-described embodiment. It is to be understood by those skilled in the art that various modifications can be made within the spirit and scope of the present disclosure.

The invention claimed is:

1. A driver condition determination device that is mounted in a vehicle capable of permitting a driver to adjust a position of a driver's seat-in a front-rear direction and is used to analyze a face image of the driver in order to determine a driver condition that affects driving of the vehicle, the driver condition determination device comprising:
   a face image capturing device that is used to capture the face image of the driver from a front of the driver; and
   a driver condition determination section that determines the driver condition by analyzing the face image captured by the face image capturing device, wherein
      the face image capturing device includes an image sensor that generates image data of the face image,
      the face image capturing device includes an imaging optical system that forms the face image on the image sensor,
      the imaging optical system has a focal point fixed at a position where a circle of confusion with respect to a foremost face position is larger than a circle of confusion with respect to a rearmost face position, the rearmost face position being where the face of the driver is positioned when the driver's seat is moved to a rearmost limit, the foremost face position being where the face of the driver is positioned when the driver's seat is moved to a foremost limit,
      the driver condition determination section normalizes the face image captured by the face image capturing device to a predetermined size and analyzes the normalized face image, and
      the driver condition determination section enlarges the face image captured at the rearmost face position to the predetermined size as the normalizing the face image and analyzes the enlarged face image.

2. The driver condition determination device according to claim 1, wherein the focal point of the imaging optical system is fixed at a position where a value of a modulation transfer function (MTF) at the foremost face position is smaller than a value of the MTF at the rearmost face position.

3. The driver condition determination device according to claim 1, wherein the focal point of the imaging optical system is fixed at an intermediate position between the foremost face position and the rearmost face position or at a position farther away from the imaging optical system than the intermediate position.

4. The driver condition determination device according to claim 1, wherein an f-number of the imaging optical system is set to a value not greater than 2.0.

5. The driver condition determination device according to claim 1, wherein the driver condition determination section reduces the face image captured at the foremost face position to the predetermined size as the normalizing the face image and analyzes the reduced face image.

6. The driver condition determination device according to claim 5, wherein the imaging optical system has the focal point fixed at the position where a circle of confusion of the reduced face image is equal in size to a circle of confusion of the enlarged face image.

* * * * *